United States Patent [19]

Rigal et al.

[11] 4,346,153
[45] Aug. 24, 1982

[54] ELECTRODE FOR A LEAD-ACID STORAGE CELL

[75] Inventors: Michel Rigal, Lille; Jean Saerens, Haubourdin, both of France

[73] Assignee: Compagnie Europeenne d'Accumulateurs, Paris, France

[21] Appl. No.: 222,761

[22] Filed: Jan. 6, 1981

[30] Foreign Application Priority Data

Jan. 18, 1980 [FR] France ................. 80 01065

[51] Int. Cl.³ .................. H01M 4/68; H01M 4/70
[52] U.S. Cl. ................................ 429/234; 429/245
[58] Field of Search .......................... 429/245, 234

[56] References Cited

U.S. PATENT DOCUMENTS

| 715,343 | 12/1902 | Blanc | 429/245 |
|---|---|---|---|
| 1,126,671 | 1/1915 | Wilson | 429/245 |
| 2,739,997 | 3/1956 | Carrick et al. | 136/57 |
| 3,870,563 | 3/1975 | Ruben | 429/245 |
| 3,884,716 | 5/1975 | Walker | 429/245 |
| 3,905,828 | 9/1975 | Barber | 136/6 R |
| 3,973,992 | 8/1976 | Krug et al. | 429/245 |
| 4,037,031 | 7/1977 | Jacob | 429/245 |
| 4,127,709 | 11/1978 | Ruben | 429/245 |
| 4,136,235 | 1/1979 | Nora et al. | 429/245 |

FOREIGN PATENT DOCUMENTS

| 2415032 | 10/1974 | Fed. Rep. of Germany . |
| 2404642 | 8/1975 | Fed. Rep. of Germany . |
| 2009491 | 6/1979 | United Kingdom . |

*Primary Examiner*—Donald L. Walton
*Attorney, Agent, or Firm*—Kenyon & Kenyon

[57] ABSTRACT

An electrode for a lead-acid storage cell, electrode containing an active material (8), an active material support and at least one electric conductor which includes a core (10) made of a metal whose electric conductivity is higher than that of lead. Said core is coated with a protective layer (11) made of a substance chosen from the group comprising titanium, tungsten, tantalum, niobium, zirconium and alloys thereof.

13 Claims, 4 Drawing Figures

ELECTRODE FOR A LEAD-ACID STORAGE CELL

BACKGROUND OF THE INVENTION

The present invention relates to an electrode for a lead-acid storage cell. Such an electrode includes an active material contained in a support together with current collectors. In the case of grid type plates, the grid is made of lead or of a lead alloy and is used simultaneously as a support and as a current collector; however, the electrode may also include extra current collectors outside the grid proper which serve to connect it to neighbouring electrodes or to a terminal electrode.

In the case of tube type plates, the active material is contained in sleeves, and the current collectors are constituted in particular by spines inserted in the sleeves and connected to a frame; the spine/frame assembly is made of lead or of a lead alloy and can be connected to current collectors outside the frame as in the case of grid type plates.

In all cases, and for either positive or negative electrodes, it is necessary to increase the electric conductivity of the current collectors as much as possible, whether or not they are in contact with the active material.

Therefore, current collectors have already been used which are made of a material whose electric conductivity is higher than that of lead, e.g. copper or aluminum; to this end said collectors have also been covered with a protective layer made of iron, lead-tin alloy, etc.

However, during operation, the positive electrodes of lead-acid storage cells undergo extensive corrosion; for example, in the case of grid-type plates, following an accidental defect in the moulding of the grid, or simply at the end of the storage cell's life, it can happen that sulphuric acid enters the core of the grid. If the grid is made of a copper or aluminum conductor coated with known substances, this very rapidly destroys the conductor completely. If copper is used, it migrates towards the negative electrode and causes rapid self-discharge of the storage cell.

Preferred embodiments of the present invention mitigate these drawbacks.

SUMMARY OF THE INVENTION

The present invention provides an electrode for a lead-acid storage cell, said electrode containing an active material, an active material support and at least one electric conductor which includes a core made of a substance chosen from the group comprising copper, aluminum, silver, zinc and alloys of each of these metals, said core being coated with a protective layer made of a substance chosen from the group comprising titanium, tungsten, tantalum, niobium, zirconium and alloys thereof.

In a first variant, said conductor is integrated in the support of the active substance proper, i.e. in a frame member of the electrode and/or in the case of a grid-type electrode, at least one bar of the grid. The core coated with its protective layer is thus coated with lead or with a lead alloy.

In a second variant, said conductor is outside the active material support and the protective layer is welded to the frame of the lead or lead alloy electrode so that the frame comes into electrical contact with the substance which forms the core.

When sulphuric acid reaches the protective layer made of one of the substances chosen from the group comprising titanium, tungsten, tantalum, niobium, zirconium and their alloys, this layer is transformed into a passivating layer of oxide of the corresponding substance, said layer being quite unaffected by sulphuric acid.

As mentioned hereinabove in the case of the first variant, the danger of such acid attack occurs only in the case of a local accident or at the end of the storage cell's life. The formation of a small zone of oxide around the copper does not appreciably modify the conductivity of the electrode support, and the storage cell continues to operate normally.

In the case of the second variant, the protective layer is transformed immediately into a layer of oxide as soon as the electrode is immersed in the sulphuric acid, and electrical contact is maintained without degradation between the core of the conductor and the frame of the electrode.

In both variants, the core can be in the form of a wire, a strip or a bar.

The thickness of the protective layer is preferably less than 500 $\mu$m and is, for example, about 100 $\mu$m.

The invention also provides a method of manufacturing both variants. In both cases, the sides of the core have protective layers applied by a simultaneous drawing or extrusion operation. The ends of the core are protected either by welding the ends of the protective layer (e.g. by electron bombardment) or by a plug made of synthetic resin or by a lead plug welded to the ends of the protective layer.

In the first variant, the conductor thus obtained is disposed in the mould of the electrode support before it is filled with molten lead or molten lead alloy. An electrode support can also be provided which has a recess designed to accommodate the conductor, and this recess is closed with lead or lead alloy.

In the second variant, the conductor is welded to lead or lead alloy parts of the electrode frame or of a connection connected to this frame.

BRIEF DESCRIPTION OF THE DRAWINGS

Other characteristics and advantages of the present invention become apparent from the following description given with reference to the accompanying illustrating drawings in which.

DESCRIPTION OF PREFERRED EMBODIMENTS

Figure 1:
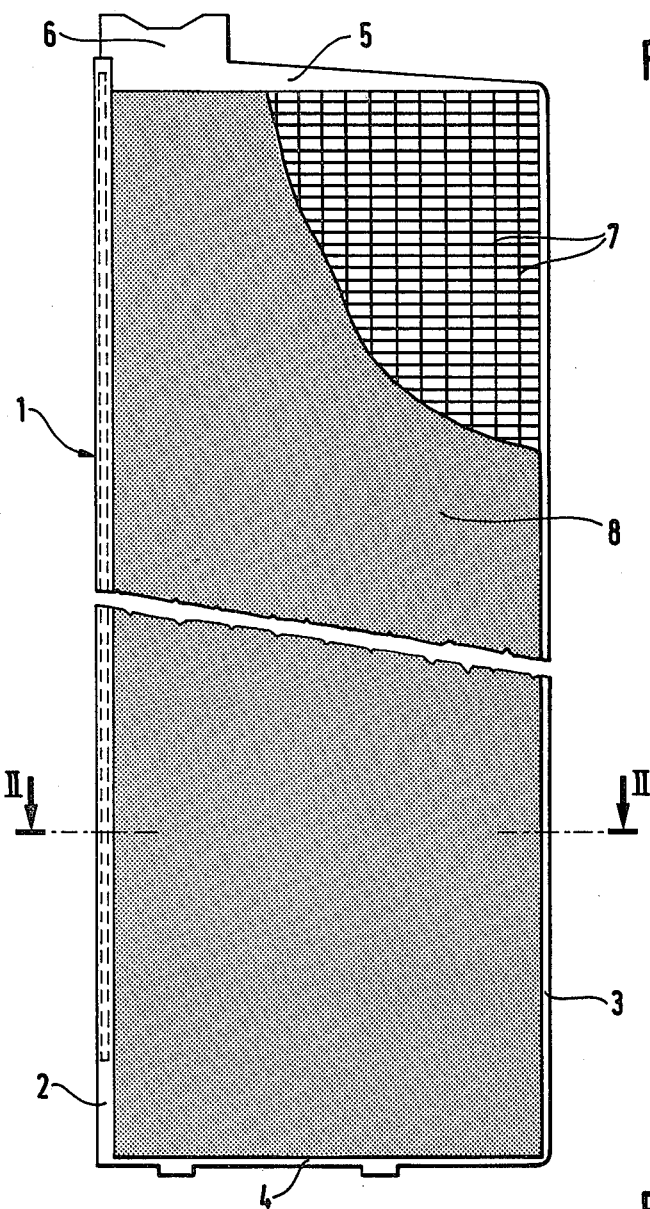
FIG. 1 is a partially cut-away view of a first variant of a positive grid-type electrode in accordance with the invention.

FIG. 1 schematically illustrates a positive electrode 1 of the grid type; the support of the active material 8 is constituted by a grid formed by bars 7 and surrounded by a frame whose members are referenced 2,3,4 and 5; the upper horizontal frame member 5 is provided with a plate lug 6; the support as a whole is made of an alloy of lead and antimony.

Figure 2:
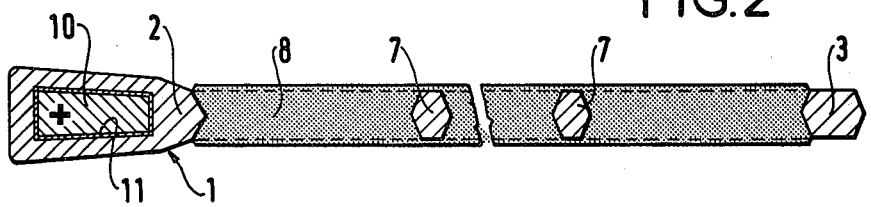
FIG. 2 is a partial cross-section along line II—II of FIG. 1.

In accordance with the invention, the vertical member 2 contains an electric conductor which has a copper core 10 coated with a layer 11 of titanium (see FIG. 2).

Figure 3:
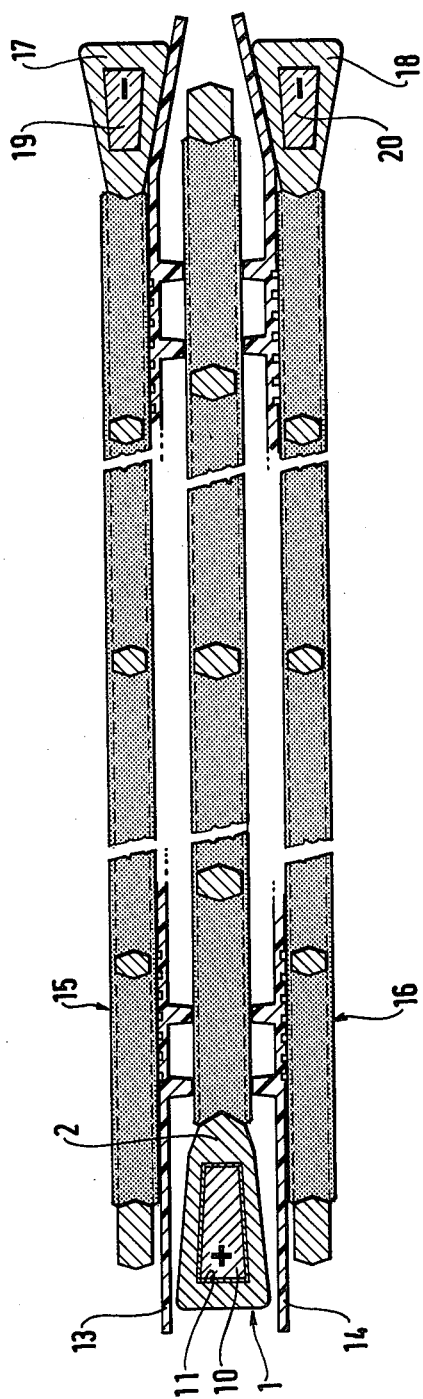
FIG. 3 is a partial cross-section of the electrode of FIG. 2 accompanied by two separators and two negative electrodes.

By way of example, the electrode has the following dimensions:

Height: about 90 cm
Width: about 30 cm
Length of the conductor: 82 cm
Cross-section of the copper core: 24 mm$^2$
Thickness of the titanium layer: 100 microns The positive electrode 1 equipped with its conductor is inserted between two negative electrodes 15 and 16 (see FIG. 3) of a storage cell. Separators 13 and 14 are interposed between the electrode 1 and the negative electrodes 15 and 16. Members 17 and 18 of the negative electrodes include built-in copper conductors 19 and 20 which are not necessarily provided with a protective layer, since the negative electrodes are not subjected to corrosion in the same manner as are the positive electrodes. There is an unusual disposition of the ends of the separators 13 and 14 in the neighbourhood of the frame members 17 and 18 so as to compensate for the extra thickness of these frame members relative to the rest of the electrode. This extra thickness is unnecessary if the conductors 19 and 20 are coated with a protective layer to allow the thickness of their lead covering to be reduced.

A storage cell in accordance with the prior art and a storage cell in accordance with the invention were subjected to rapid discharge for one hour and the potentials were measured at the surface of a positive electrode of each of them, taking the potential of the lug of the electrode as the reference potential.

In the positive electrode of the prior art, the potential measured between the lug and the lower part of the electrode was 163 mV. In the positive electrode connected to its conductor 10, the potential measured was 67 mV.

It is therefore clearly apparent that the potential difference across the positive electrodes in accordance with the invention is greatly reduced relative to that of electrodes in accordance with the prior art. It is very important to minimize this potential difference which occurs especially on large electrodes, since when the difference is reduced they can be discharged more deeply.

The conductor described is a sole conductor built into a vertical frame member; other conductors can be built into both the frame members and bars themselves so as further to reduce potential differences.

The frame described may very well be that of an electrode in which the active material is disposed in tubular sheaths.

Of course, the copper can be replaced by any one of the materials mentioned hereinabove; the same applies to the titanium.

Figure 4:
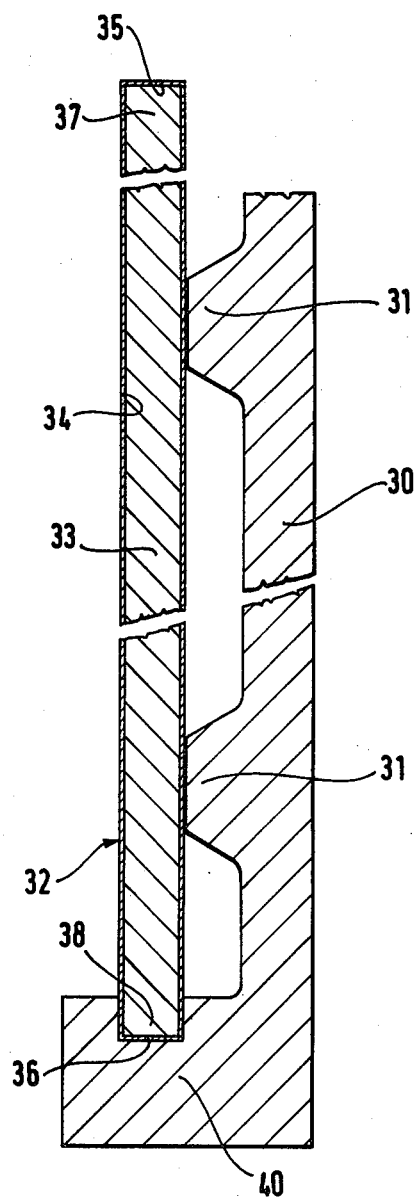
FIG. 4 illustrates schematically a partial cross-section of the second variant of an electrode in accordance with the invention provided with a conductor on the outside of its frame.

FIG. 4 very schematically illustrates a partial cross-section of a frame member of an electrode 30 (which can be of the grid type or of the tubular type). The upright has zones 31 welded to an outer current collector 32; this collector includes a copper core (or the equivalent) coated with a tungsten protective layer 34 (or the equivalent); the ends 37 and 38 of the core are protected by the ends 35 and 36 of the protective layer which are welded e.g. by electron bombardment. The coated end 38 is fitted into the end 40 of the frame member of the electrode.

Of course, the invention is not limited to the examples which have just been described. Without going beyond the scope of the invention, any disposition can be replaced by an equivalent disposition.

We claim:

1. An electrode for a lead-acid storage cell, said electrode containing an active material, an active material support made of lead or a lead alloy, and at least one electric conductor which includes an elongated core made of a substance chosen from the group consisting of copper, aluminum, silver, zinc, and alloys of each of these metals, said core being coated with a protective layer made of a substance chosen from the group consisting of titanium, tungsten, tantalum, niobium, zirconium and alloys thereof.

2. An electrode for a lead-acid storage cell according to claim 1, wherein said core is in the form of a wire.

3. An electrode for a lead-acid storage cell according to claim 1, wherein said core is in the form of a strip.

4. An electrode for a lead-acid storage cell according to claim 1, wherein said core is in the form of a bar.

5. An electrode for a lead-acid storage cell according to claim 1, wherein the thickness of the protective layer of the core is less than 500 $\mu$m.

6. An electrode for a lead-acid storage cell according to claim 5, wherein said thickness is about 100 $\mu$m.

7. An electrode for a lead-acid storage cell according to claim 1, wherein said electric conductor is built into the lead or lead alloy support of the active material such that the core coated with its protective layer is coated with lead or with lead alloy.

8. An electrode for a lead-acid storage cell according to claim 1, wherein said conductor is outside the active material support and wherein its protective layer is bonded to at least one lead portion of said support.

9. An electrode according to claim 7, wherein the core is formed with its protective layer along its side surfaces, the ends of the core being protected, the core being inserted in a cavity provided in the support of the electrode, and the cavity being closed with molten lead or with molten lead alloy.

10. An electrode according to claim 8, wherein the core is formed with its protective layer along its side surfaces, the ends of the core being protected and the protective layer being bonded to at least one lead portion of this support.

11. An electrode according to either one of claims 9 or 10, wherein the ends of the core are protected by bonding the ends of the protective layer.

12. An electrode according to either one of claims 9 or 10, wherein the ends of the core are each protected by a plug made of lead.

13. An electrode according to either one of claims 9 or 10, wherein the ends of the core are each protected by a plug made of a synthetic resin.

* * * * *